US009654414B2

(12) United States Patent
Chatterjee et al.

(10) Patent No.: US 9,654,414 B2
(45) Date of Patent: May 16, 2017

(54) SCHEDULING COST EFFICIENT DATACENTER LOAD DISTRIBUTION

(71) Applicant: International Business Machines Corporation, Armonk, NY (US)

(72) Inventors: Aveek N. Chatterjee, Bangalore (IN); Hendrik F. Hamann, Yorktown Heights, NY (US); Shankar Km, Bangalore (IN); Siyuan Lu, Yorktown Heights, NY (US); Kota V. R. M. Murali, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 14/490,122

(22) Filed: Sep. 18, 2014

(65) Prior Publication Data

US 2016/0087909 A1  Mar. 24, 2016

(51) Int. Cl.
| | | |
|---|---|---|
| *G06Q 10/00* | (2012.01) | |
| *G06F 17/00* | (2006.01) | |
| *G06F 17/15* | (2006.01) | |
| *H04L 12/911* | (2013.01) | |
| *G06F 9/50* | (2006.01) | |
| *G06Q 30/02* | (2012.01) | |
| *G06Q 10/06* | (2012.01) | |

(52) U.S. Cl.
CPC ............ *H04L 47/70* (2013.01); *G06F 9/505* (2013.01); *G06F 9/5083* (2013.01); *G06F 9/5094* (2013.01); *G06Q 10/063* (2013.01); *G06Q 30/0206* (2013.01); *Y02B 60/142* (2013.01)

(58) Field of Classification Search
CPC .... G06Q 50/06; G06Q 10/06; G06Q 10/0637; G05B 15/02; G05B 13/02; G05B 2219/2639; H02J 2003/003
USPC ......... 700/291, 295, 286, 297; 709/250, 226
See application file for complete search history.

(56) References Cited

U.S. PATENT DOCUMENTS

| | | | |
|---|---|---|---|
| 7,120,520 B2 | 10/2006 | Seto et al. | |
| 8,242,630 B2 | 8/2012 | Tamaki et al. | |
| 8,458,101 B2 | 6/2013 | Wei et al. | |
| 8,849,469 B2 * | 9/2014 | Belady ............. | G06Q 10/06312 700/291 |
| 2010/0223385 A1 * | 9/2010 | Gulley .................. | G06F 9/5027 709/226 |
| 2011/0106322 A1 | 5/2011 | Ou | |

(Continued)

OTHER PUBLICATIONS

Li et al., "Towards Optimal Electric Demand Management for Internet Data Centers", IEEE Transactions on Smart GRID, vol. 3, No. 1, Mar. 2012, pp. 183-192.

(Continued)

*Primary Examiner* — Thomas Dailey
*Assistant Examiner* — Abderrahmen Chouat
(74) *Attorney, Agent, or Firm* — L. Jeffrey Kelly

(57) ABSTRACT

A method for scheduling cost efficient data center load distribution is described. The method includes receiving a task to be performed by computing resources within a set of data centers. The method further includes determining, all available data centers to perform the task. The method further includes determining lowest computing cost task schedule from available data centers. The method further includes scheduling the task to be completed at an available data center with the lowest cost computing.

20 Claims, 5 Drawing Sheets

(56) References Cited

U.S. PATENT DOCUMENTS

| | | |
|---|---|---|
| 2011/0137476 A1 | 6/2011 | Al-Mazeedi |
| 2011/0295610 A1 | 12/2011 | Wei et al. |
| 2013/0035795 A1 | 2/2013 | Pfeiffer et al. |
| 2013/0111494 A1 | 5/2013 | Hyser et al. |
| 2013/0212410 A1 | 8/2013 | Li et al. |

OTHER PUBLICATIONS

Tang et al., "Thermal-Aware Task Scheduling to Minimize Energy Usage of Blade Server Based Datacenters", Proceedings of the 2nd IEEE International Symposium on Dependable, Autonomic and Secure Computing (DASC'06), 2006, 8 pages.

Chen et al., "Green-Aware Workload Scheduling in Geographically Distributed Data Centers", 2012 IEEE 4th International Conference on Cloud Computing Technology and Science, 2012, pp. 82-89.

Goiri et al., "Parasol and GreenSwitch: Managing Datacenters Powered by Renewable Energy", ASPLOS'13, Mar. 16-20, 2013, pp. 51-63.

Aksanli et al., "Utilizing Green Energy Prediction to Schedule Mixed Batch and Service Jobs in Data Centers", HotPower '11, Oct. 23, 2011, pp. 1-5.

Goiri et al., "GreenHadoop: Leveraging Green Energy in Data-Processing Frameworks", EuroSys'12, Apr. 10-13, 2012, 14 pages.

Haque et al., "Providing Green SLAs in High Performance Computing Clouds", Department of Computer Science, Rutgers University, Piscataway, NJ 08854-8019, 11 pages.

Yao et al., "Data Centers Power Reduction: A two Time Scale Approach for Delay Tolerant Workloads", Proc. IEEE INFOCOM, 2012, University of Southern California, Los Angeles, CA 90089, 9 pages.

\* cited by examiner

SCHEDULING COST EFFICIENT DATACENTER LOAD DISTRIBUTION

BACKGROUND

The present invention relates generally to the field of power distribution architecture for data centers, and more particularly to DC-based architecture for powering data centers.

Recent trends illustrate a shift from large main frame computing to server clusters located in geographically dispersed areas. Computational arrays like server farms are becoming more common as cloud and remote computing expand. Growing demand and raising energy prices constitutes one of the highest costs in data center operations. A single datacenter may contain many thousands of servers in order to provide services for millions. Majority of data centers utilize server redundancy and uninterrupted power supply systems (UPS systems) for operations. Such arrangement relies on duplication of systems and protection devices in order to limit data loss. Servers and UPS systems typically generate a tremendous amount of heat on standby and during operation. To address the excessive heat, the physical environments of datacenters are strictly controlled with large air conditioning systems. Tremendous power consumption of these facilities and growing sizes can be prohibitively expensive and strain energy resources during periods of heavy power usage.

SUMMARY

Embodiments of the present invention disclose a method, computer program product, and system for scheduling cost efficient data center load distribution. A computer receives a task to be performed by computing resources within a set of data centers. The computer further identifies all available data centers to perform the task. Lowest cost task schedule is determined from the available data centers. The computer further schedules the task to be completed at the cheapest available data center.

DETAILED DESCRIPTION

Figure 1:
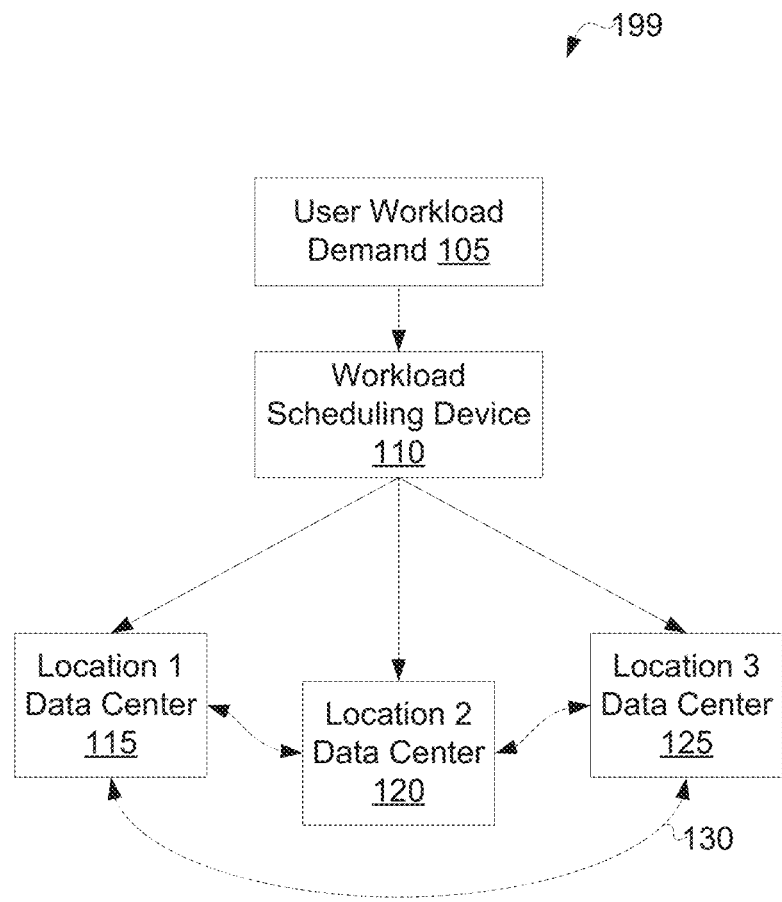
FIG. 1 is a functional block diagram illustrating a data center management environment, in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a functional block diagram illustrating a data center management environment, in accordance with an embodiment of the present invention. Data center management environment 199 includes user workload demand 105, workload scheduling device 110 and geographically dispersed data center sites, here after referred to as location 1 data center 115, location 2 data center 120 and location 3 data center 125.

User workload demand 105 represents computational and IT needs of customers, where as an example, a typical datacenter computation is performed in response to a user request and may include various computation tasks, such as, searching a database, compiling data, rendering a result, or transmitting data.

The center management environment 199 further includes a workload scheduling device 110 which calculates most efficient load dispersion amongst location 1 data center 115, location 2 data center 120, and location 3 data center 125, using forecasts of availability of green energy, utility power cost, or power consumption. Utilizing such energy profiles, overall cost is reduced by scheduling workload to data centers within locations with higher forecasted availability of green energy, such as, wind power, solar power, or areas with cooler ambient temperatures or utility cost reducing operation cost.

The user workload demand 105 is sent to the workload scheduling device 110, which then forecasts the lowest computational cost available between location 1 data center 115, location 2 data center 120, and location 3 data center 125. The lowest computational cost may be calculated by using individual location's power consumption characteristics, energy profiles, and information related to user specified workload demand 105. In some embodiments, based on certain user specified workload demand 105 location 1 data center 115, location 2 data center 120, and location 3 data center 125 may distribute computational load by utilizing data transfer 130 between all or certain locations in order to collectively accomplish the user specified workload at lowest cost.

Figure 2:
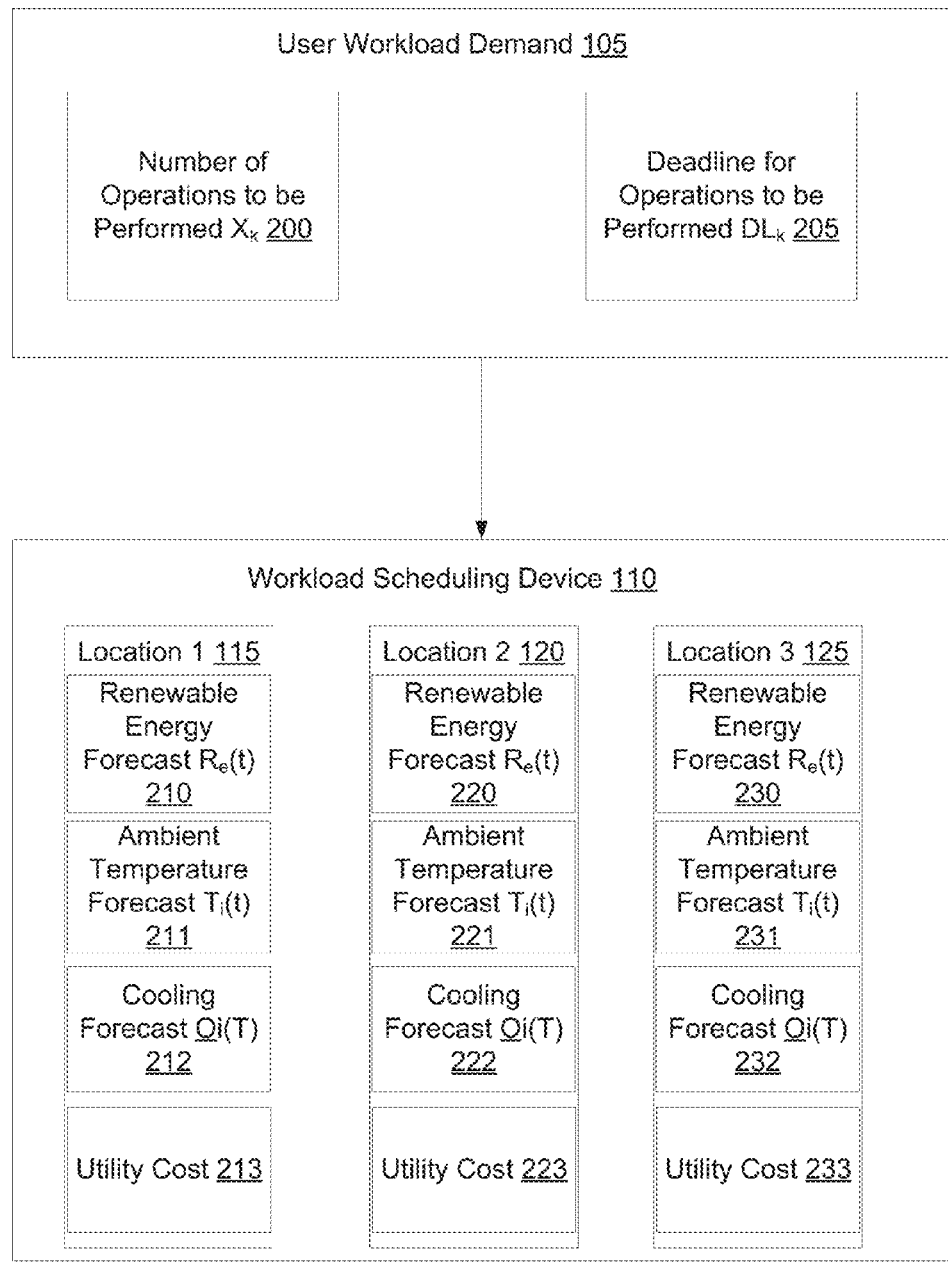
FIG. 2 is a schematic block diagram of workload scheduling device within the environment of FIG. 1, in accordance with an embodiment of the present invention.

FIG. 2 is a schematic block diagram of workload scheduling device within the environment of FIG. 1, in accordance with an embodiment of the present invention. User workload demand 105 may contain all information relating to user specified workload, such as, deadlines for operations $(DL_k)$ 205 and a number of operations to be performed $(X_k)$ 200.

Deadlines for operations $(DL_k)$ 205 may be included within user workload demand 105 and may involve fixed tasks which are dependent on specific dates of completion, and thus must be processed at certain time intervals. Tasks including deadlines for operations $(DL_k)$ 205 may be processed based on data center location, at a higher priority and a potential higher cost due to temporal limitations. For example, tasks with deadlines for operations $DL_k$ 205 may include computational tasks that must be completed by the closing bell of the New York Stock Exchange. In such an exemplary embodiment the workload scheduling device 110 would be limited to available data centers that can handle the workload by 4:30 P.M. Eastern Standard Time. Time sensitive tasks may increase the average cost of completion based on the availability of data centers.

Other information included in a user workload demand 105 may be the number of operations to be performed $(X_k)$ 200. Workload schedule may be developed based on the amount of computational work needed to be accomplished. Based on workload, tasks may be divided among single or plural data centers with the lowest operational costs. In such an embodiment, data centers at different locations may be tasked with the workload based on the availability of green power, cost of utilities and ambient temperatures at that location. For example, one data center may initiate the user workload demand 105 and when another location with lower cost becomes available, the load transfer 130 may occur to a secondary location in order to minimize the computing cost.

To determine workload scheduling, workload scheduling device 110 may utilize the information provided by user workload demand 105 and calculate the optimal scheduling scheme based on individual data center's energy profile. In an exemplary embodiment, the workload scheduling device 110 may analyze the power consumption cost of three geographically diverse data center locations. For example, information from different location data centers may be received containing renewable energy forecasts ($R_e(t)$) 210, 220, and 230 for a desired time of task completion, ambient temperature forecasts ($T_i(t)$) 211, 221, and 231, cooling forecasts ($O_i(t)$) 212, 222, and 232, and utility costs 213, 223, and 233. Same information from the location 1 data center 115, location 2 data center 120, and location 3 data center 125 (containing renewable energy forecasts ($R_e(t)$) 210, 220 and 230, ambient temperature forecasts ($T_i(t)$) 211, 221, 231, cooling forecasts ($O_i(t)$) 212, 222, 232, and utility costs 213, 223, 233) may be used to estimate the lowest computational cost for tasks sent from user workload demand 105 to workload scheduling device 110. If user workload demand 105 contains deadlines for operations ($DL_k$) 205, workload scheduling device 110 may limit the site availability to ones who can perform the work at lowest cost and reach the deadline. Similarly, workload scheduling device 110 may limit or expand the number of locations based on number of operations to be performed ($X_k$) 200, where locations without the capacity to handle the workload would be rejected from scheduling.

Renewable energy forecasts ($R_e(t)$) 210, 220 and 230 may include time based estimate of production of energy from renewable sources of energy at individual data center locations. Locations utilizing this supplemental production of energy can either generate their own electricity or draw directly from onsite renewable power plant, reducing energy losses involved in power conversion and transmission over long distances. One form of renewable energy utilized in data center energy profile may be solar power. In most data center applications, solar energy production consists of a set of photovoltaic modules electrically connected to generate Direct Current output to a data center battery bank. During charging operations, energy produced by the solar panels may be stored and used to supplement uninterruptible power source systems to provide emergency power to a load when the utility source fails, or depending on application be converted to alternating current to reduce utility dependency.

Other sources of renewable energy may include wind power, bioenergy, or geothermal power. Wind power may produce Alternating Current with variable frequency. The frequency of a wind turbine will vary with the speed of a rotor. The output current may then be rectified to Direct Current and then re-inverted back to Alternating Current with desired voltage and frequency. In data center application, output current from a solar module may be converted to Direct Current and then supplied to data center's battery banks. Such renewable resources provide for inherently intermittent power production, thereby requiring corresponding utility support as primary source of electricity to meet individual facility's load demand profile. For example, a data center may produce less renewable energy on cloudy days or none at the night. During periods of such fluctuating production, facility operators are forced to rely on utility produced electricity, enlarging the cost of operation for that period.

Depending on the type of renewable energy at a given location individual data centers may rely on weather forecasts or wind predictions to create a renewable energy forecasts $R_e(t)$ 210, 220 and 230. Solar power forecasting may include implementation of the Sun's path, atmosphere's condition predicted using, for example, geostationary satellite imagery or numerical weather prediction model products, atmospheric light scattering process and the individual characteristics of the solar production to determine the amount of energy available for a given period. Similarly, the availability of wind power may be forecasted based on numerical weather prediction models. The satellite imagery and numerical weather prediction models may be obtained from governmental meteorological agencies such as the National Oceanic and Atmospheric Administration (NOAA). Information containing estimates of renewable energy production for a specific period may be sent to a workload scheduling device 110 in order to determine the individual data center's cost of operation for a specific period.

Close to half of all power delivered to a conventional data center is consumed by chiller cooling units and computer room air conditioning systems. Temperature is a critical factor in data center operations and is rigorously maintained through temperature and humidity control. The temperature in a data center will naturally rise because the electrical power used heats the ambient air. Unless the heat is dissipated, the facility's ambient temperature will rise, resulting in electronic equipment malfunction or critical failure. By controlling the air temperature, the server components are kept within the manufacturer's specified temperature/humidity range. Air conditioning systems help control humidity by cooling the return space air below the dew point. In an event where humidity control or air conditioning system stops operating humidity and water may begin to condense on internal components. Similarly, dry atmosphere may cause static electricity discharge problems. In such an event, ancillary humidification systems may add water vapor raise the humidity. Another factor greatly affecting data center operational cost is a geographic temperature variation. These variations directly correlate to data center's energy consumption. For example, the computational cost for location 1 data center 115 where the outside temperature reaches 75 degrees Fahrenheit is much lower than location 3 data center 125 with outside temperature of 90 degrees Fahrenheit. The 15 degree difference at location 3 data center 125 may drive the computational cost significantly, and serve as a deciding factor in task scheduling, due to the air cooling system's additional use of energy to reach recommended standards for internal temperature and humidity.

Ambient temperature forecasts ($T_i(t)$) 211, 221, and 231 received by workload scheduling device 110 may predict the humidity and temperature during in a specific time period for a given location. Another element affecting a computational cost may be the size and characteristics of the cooling systems located in individual data centers. For example, newly built data center facilities may incorporate greater efficiency, facilities with a larger footprint may require cooling units. In such load variations, power draw of cooling units may range from a few kW for a rack of servers to several MW for large facilities. Some data center facilities may have power densities more than 100 times that of a typical office building which relate to electricity costs as a dominant operating expense.

Cooling forecasts ($O_i(t)$) 212, 222, 232 sent to workload scheduling device 110 may be calculated by utilizing various element such as; specific characteristics of each facility, number of cooling units and their efficiency, total area to be cooled amount of heat output for individual equipment, outside temperature, and cost of electricity. The price of electric power is often dictated by a local utility company engaging in the generation, transmission and distribution of electricity to that area. Geographic territories may divide into specific rates based on the consumption and type of service provided by the utility company. For example, residential users are likely to be charged a different rate than commercial customers. Often rate schedules reflect varying consumption levels, patterns, times, and the associated impact on the utility's costs of providing electrical service to a customer. Generally, the average price per kilowatt hour may fluctuate with a time of day, season, and overall demand in the location. Utility costs 213, 223, 233 may be supplied to the workload scheduling device 110 by location 1 data center 115, location 2 data center 120, and location 3 data center 125 and reflect the individual geographic kilowatt hour cost for specific period of time or be calculated by the workload scheduling device 110 based on available rates for the geographic area. Utilizing such information and the method discussed in FIG. 3, workload scheduling device 110 selects the data center or combination of data centers with the lowest operating cost.

Figure 3:
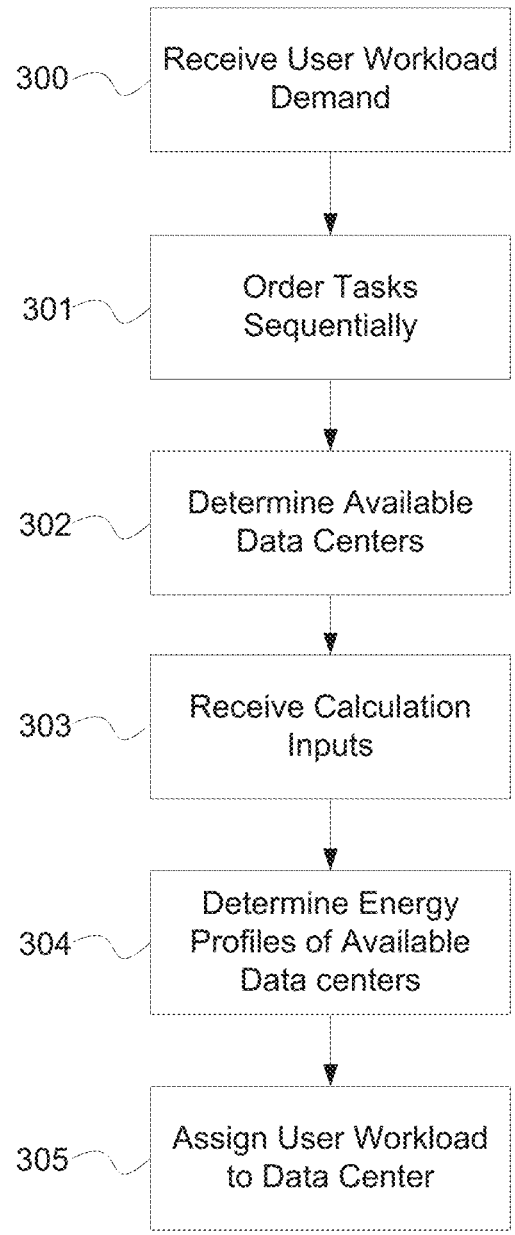
FIG. 3 illustrates operational steps of a workload scheduling device within the data center management environment of FIG. 1, in accordance with an embodiment of the present invention.

FIG. 3 illustrates operational steps of a workload scheduling device within the data center management environment of FIG. 1, in accordance with an embodiment of the present invention.

Workload scheduling device 110 receives information relating to computational tasks from user workload demand 105. Computational tasks may include information relating to any deadlines for operations ($DL_k$) 205 imposed by a user, and a number of operations to be performed ($X_k$) 200 (step 300).

Utilizing deadlines for operations ($DL_k$) 205 and number of operations to be performed ($X_k$) 200, workload scheduling device 110 arranges tasks sequentially based on imposed deadlines, and the size or number of computation (step 301). As an example tasks received by workload scheduling device 110 may be written as N where k represents the number of operations:

$$k \in \{1 \ldots N\} \qquad \text{Eq. 1}$$

deadlines for operations ($DL_k$) 205 may be represented as $DL_k$ and the number of operations to be performed ($X_k$) 200 may be written in terms of each individual task as $X_k$, where X represents individual task, and k the number of operations.

In step 302, workload scheduling device 110 determines available data centers to perform the task received from user workload demand 105. The availability of a data center facility may be based on the current workload, location, or capacity to perform the task. Available data centers may be represented as a set of i, which includes all available facility represented as M available to compute the task. Such set may be expressed as:

$$i \in \{1 \ldots M\} \qquad \text{Eq. 2}$$

After determining the available data centers, workload scheduling device 110 may receive calculation inputs from available data centers (step 303). Calculation inputs may include any information relating to individual facility's energy profile and include; renewable energy forecasts ($R_e$(t)), ambient temperature forecasts ($T_i$(t)), cooling forecasts ($O_i$(t)), and utility costs. In an exemplary embodiment of the invention, the calculation inputs may be received directly by the workload scheduling device 110 from location 1 data center 115, location 2 data center 120, and location 3 data center 125, be sent by a third party collecting such information to workload scheduling device 110, or be stored and calculated by the workload scheduling device 110.

In step 304, the workload scheduling device 110 determines the energy profiles for available data centers using calculation inputs.

Renewable energy forecast Re(t) 230 may include time based estimate of production of energy from renewable sources of energy (t indicating temporal relation to the value). Renewable energy forecast Re(t) 230 may be calculated as the expectation value of available renewable energy for a specific data center. In another embodiment of the invention, workload scheduling device 110 may calculate a probabilistic renewable energy forecast. Probabilistic renewable energy forecast determines the probability (p) of the amount of available renewable energy for a specific data center. Another calculation input received by the workload scheduling device 110 may relate to the utility costs 213, 223, and 233 for available data centers. As stated in FIG. 2, utility cost 213, 223, and 233 may be provided directly to the available individual data center or be calculated by workload scheduling device 110.

Knowing the renewable energy forecast for individual data center $Re_i$(t) and the utility cost costs 213, 223, and 233 workload scheduling device 110 may determine where the value of the energy cost $C_i$ is a function of time, power consumption, and available renewable energy power $C_i$(t, P, $Re_i$(t)). For example, a data center partially powered by its own solar/wind generation, energy cost $C_i$ is near zero when power consumption P is smaller than available renewable energy power $Re_i$(t). For the portion of power consumption P great than $Re_i$, energy cost $C_i$ equals to the grid electricity cost at time t. In additional embodiments of the invention, energy cost may also include the cost of utilizing batteries during operation by incorporating it into the probabilistic renewable energy forecast.

Workload scheduling device 110 may also receive the value of direct energy consumption of computation in terms of kilowatt-hour (kWh) per operation represented as B. Direct energy consumption annotates the number of electricity consumed in kWh for performing an individual computational operation.

Ambient temperature forecasts ($T_i$(t)) 211, 221, 231 and cooling forecasts ($O_i$(t)) 212, 222, 232 may be received or calculated by workload scheduling device 110. Cooling forecast $O_i$(t) 212, 222, 232 calculation may be represented as a ratio of energy required for cooling to direct energy consumption B. Computational load is determined based on the task provided by user workload demand 105. Computational load may be written as in terms of number of operations per unit time may be represented as:

$$\int L_k^i(t)dt = X_k \qquad \text{Eq. 3}$$

where $L_k^i$(t) represents the number of operations executed per unit time for task k in $i^{th}$ data center, i represents individual available data center, and X is the number of operations of task k.

Based on the calculation inputs received, workload scheduling device 110 calculates the power consumption P for each available data center. Power consumption P is related to the number of operations per unit time at individual available data centers, direct energy cost per operation, and cooling overhead. For example, workload scheduling device 110 calculates power consumption $P_i$ for each individual available data center, where:

$$P_i = L^i * B[1 + O_i(T_i(t))] \qquad \text{Eq. 4}$$

Based on the power consumption $P_i$, workload scheduling device 110 may calculate the marginal energy cost in terms of a function of time and computational load, where the marginal energy cost may represent an estimate of the effect upon the future energy cost with respect to workload and time. Marginal energy cost of individual available data center may be represented as $MC^i$ where:

$$MC^i(t, L^i) = \frac{\partial C_i(t, P_i, Re_i(t))}{\partial L^i} = \frac{\partial C_i(t, P_i, Re_i(t))}{\partial P_i} \frac{\partial P_i}{\partial L^i} \quad \text{Eq. 5}$$

Figure 4:
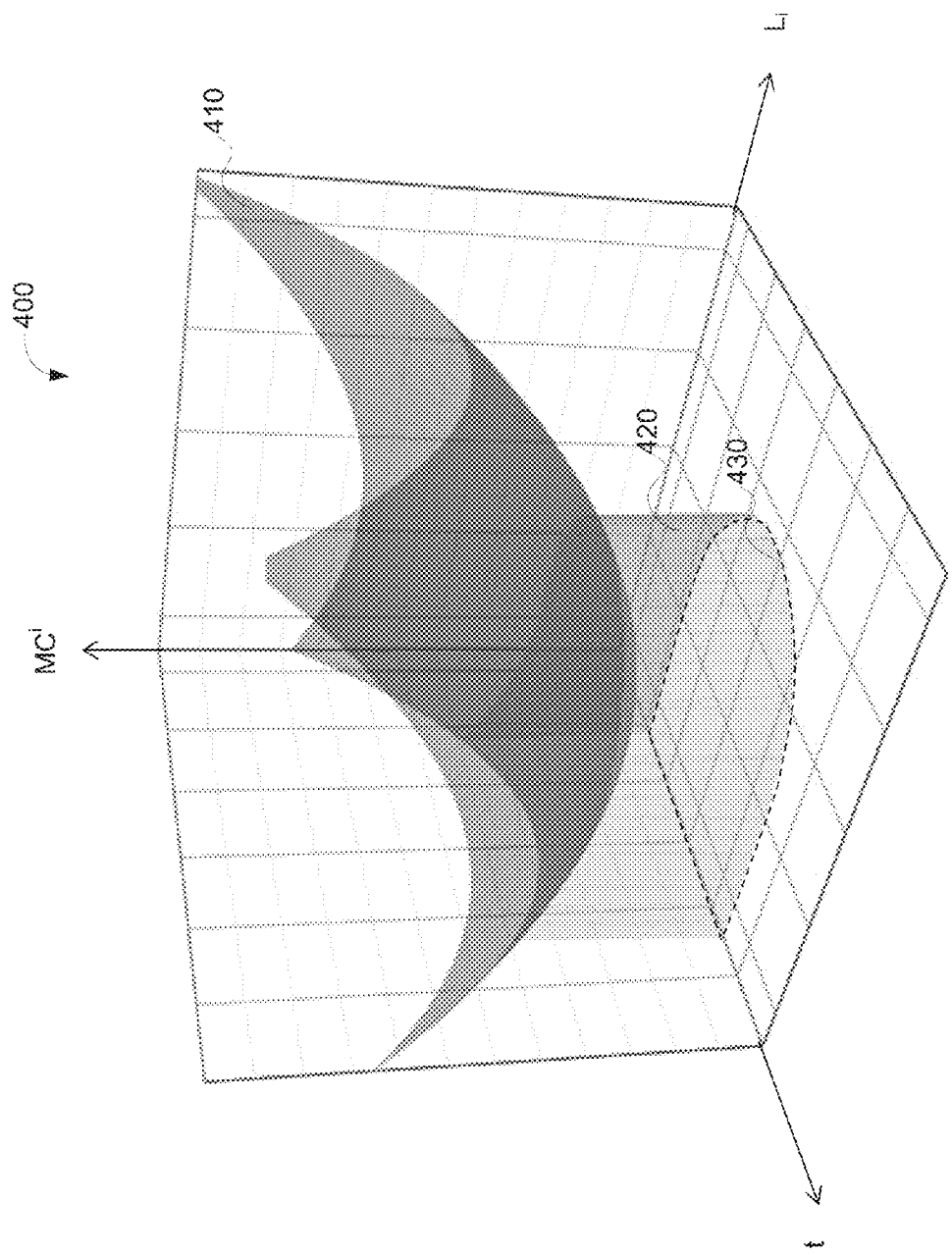
FIG. 4 depicts a graphical representation of load dispersion after workload scheduling device calculation, in accordance with an embodiment of the present invention.

By calculating the marginal energy cost ($MC^i$) workload scheduling device 110 may determine the lowest computational cost between all available data centers for the purpose of scheduling computational tasks, as described in more detail in FIG. 4.

In step 305, workload scheduling device 110 assigns user workload tasks for completion to a data canter or a plurality of data centers with the lowest determined computational cost.

FIG. 4 depicts an exemplary graphical representation of load dispersion after workload scheduling device 110 calculation, in accordance with an embodiment of the present invention. Graph 400, may include marginal energy cost ($MC^i$), calculated in FIG. 3, and depicted as a response surface plane 410 graphed as a function of time (t), and a computational load per unit of time (L) for data centers i. Cost of utility volume 420 depicted under the response surface plane 410 represents the utility costs 213, 223, and 233 for all available data centers. Projected area 430 on the t-L plane represents the computational load (L) scheduled as a function of time (t). The integrated value for projected area 430 represents the number of operations to be computed.

As an exemplary embodiment of the invention, workload scheduling device 110 may determine the lowest computational cost between all available data centers using the plots of response surfaces MC. To schedule a task k, workload scheduling device 110 may generate the corresponding MC plots represented by surface plane 410 for every DC {i=1 . . . M}. For each MC plot, workload scheduling device 110 finds the area on the t-L plane (projected area 430) which equals to the number of operations involved ($X_k$) 200 and satisfies the deadlines for operations ($DL_k$) 205 of the task. Workload scheduling device 110 optimizes the selection of the area so that the corresponding volume underneath the response surface plane 410, is the smallest. Workload scheduling device 110 compares the minimum energy cost $V_k^i$ derived from the multiple MC plots corresponding to the M data centers, to find data center I with the minimum energy cost$MinV_k^i$. The corresponding projected area on the t-L plane representing the cost of utility volume 420 may represent the optimal computational load scheduling for task k. This area may then be designated by the workload scheduling device 110 as utilized so that no other tasks may be scheduled for the area. Workload scheduling module 110 may repeat these computational steps for numerous tasks and loads. Although preferred embodiments have been depicted and described in detail herein, it will be apparent to those skilled in the relevant art that various modifications, additions, substitutions and can be made to the determination of the lowest computational cost described in FIG. 4 without departing from the spirit of the invention, and these are, therefore, considered to be within the scope of the invention, as defined in the following claims.

In another embodiment of the invention, workload scheduling device 110 may calculate the lowest cost of data transfer between two individual data centers. As an example, it may be determined that cost is lowered if the calculation originates in location 1 data center 115 and completes in location 3 data center 125. In such embodiment a data transfer cost may be calculated by including the cost of data transfer to $V_k^i$. A variable $Y_k$, where Y denotes a number of bits and k the individual task, may be used to calculate the cost at location 1 data center 115 and location 3 data center 125. $Y_k$ maybe then multiplied by the cost per bit of calculation and added to $V_k^i$ minimizing the overall cost of computation.

Figure 5:
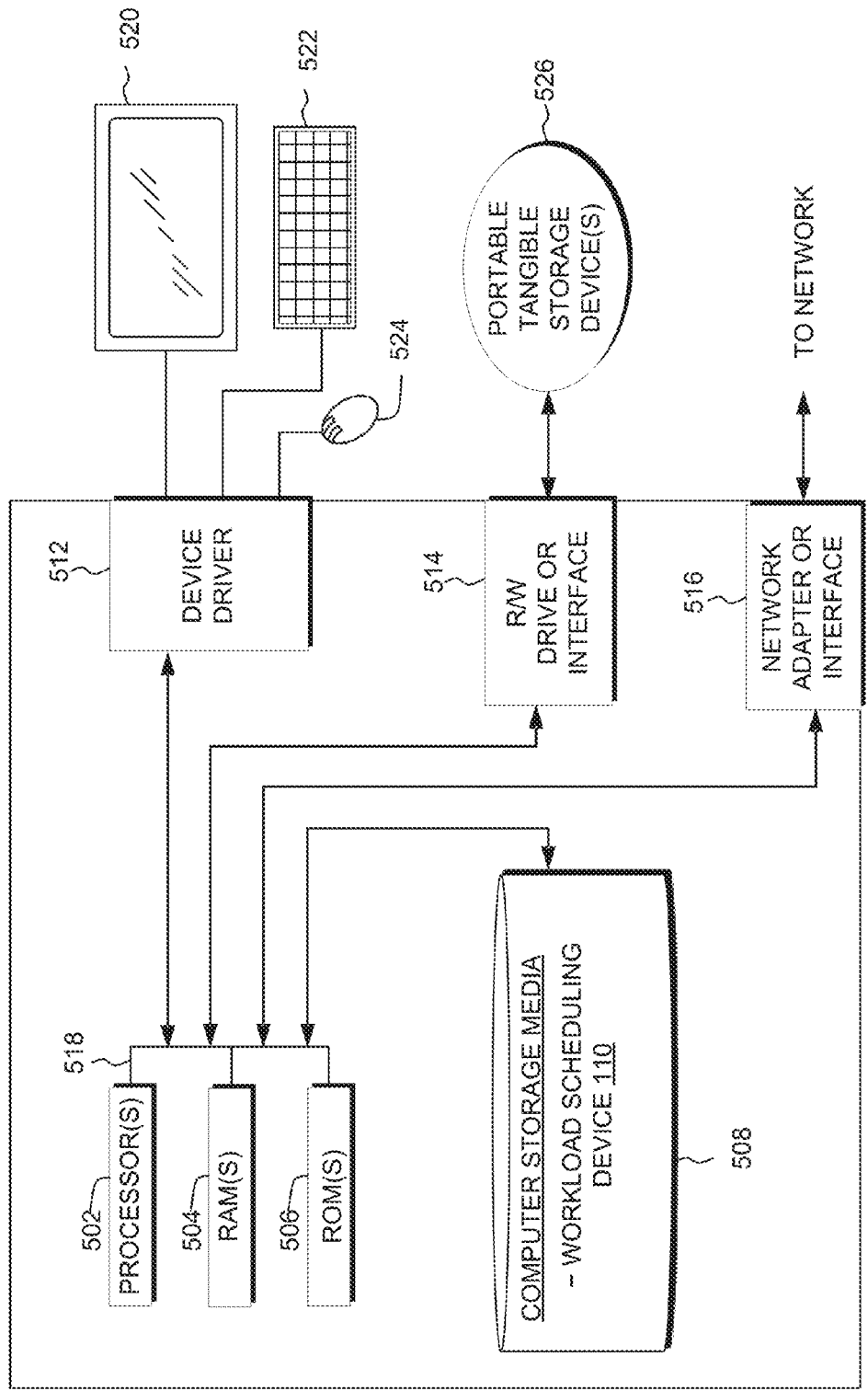
FIG. 5 depicts a block diagram of components of the workload scheduling device in accordance with an embodiment of the present invention.

FIG. 5 is a block diagram of internal and external components within the computing system of FIG. 1, in accordance with an embodiment of the present invention.

FIG. 5 depicts a block diagram of components of the workload scheduling device 110 of the data center management environment 199 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Workload scheduling device 110 can include one or more processors 502, one or more computer-readable RAMs 504, one or more computer-readable ROMs 506, one or more tangible storage devices 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within a system.

One or more operating systems 510, workload scheduling device 110 are stored on one or more of the computer-readable tangible storage devices 508 for execution by one or more of the processors 502 via one or more of the respective RAMs 504 (which typically include cache memory). In the illustrated embodiment, each of the computer-readable tangible storage devices 508 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Workload scheduling device 110 can also include a R/W drive or interface 514 to read from and write to one or more portable computer-readable tangible storage devices 526. Workload scheduling device 110 can be stored on one or more of the portable computer-readable tangible storage devices 526, read via the respective R/W drive or interface 514 and loaded into the respective computer-readable tangible storage device 508.

Workload scheduling device 110 can also include a network adapter or interface 516, such as a TCP/IP adapter card or wireless communication adapter (such as a 4G wireless communication adapter using OFDMA technology). Workload scheduling device 110 can be downloaded to the computing device from an external computer or external storage device via a network (for example, the Internet, a local area network or other, wide area network or wireless network) and network adapter or interface 516. From the network adapter or interface 516, the programs are loaded into the computer-readable tangible storage device 508. The network may comprise copper wires, optical fibers, wireless transmission, routers, firewalls, switches, gateway computers and/or edge servers.

Workload scheduling device 110 can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514 and network adapter or interface 516 can comprise hardware and software (stored in computer-readable tangible storage device 508 and/or ROM 506).

What is claimed is:

1. A method for scheduling cost efficient data center load distribution, the method comprising:
   receiving, by one or more processors, a task to be performed by computing resources within a datacenter;
   identifying, by the one or more processors, all available data centers to perform the task;
   determining, by the one or more processors, a lowest computing cost task schedule for each available data center, wherein determining the lowest computing cost task schedule comprises:
      calculating a marginal cost associated with each available datacenter, the marginal cost representing an estimate of future energy cost with respect to a computational load (L) and time (t),
      generating, for each available data center, a response surface plot of the calculated marginal cost as a function of time (t) and the computational load (L) per unit of time,
      finding a projected area on the t-L plane in each of the response surface plots, and
      optimizing the projected area such that a volume underneath each of the response surface plots corresponds to a smallest volume, wherein the smallest volume is associated with the lowest computing task schedule; and
   scheduling, by the one or more processors, the task to be performed at the available data center with the lowest computing cost task schedule.

2. A method in accordance with claim 1, wherein receiving a task further comprising:
   determining, by the one or more processors, a number of operations to be performed; and
   in response to determining a number of operation to be performed, identifying, by the one or more processors, deadlines for those operations.

3. A method in accordance with claim 2, further comprising:
   arranging, by the one or more processors, the task based on identified deadlines and a size of calculation for each task.

4. A method in accordance with claim 3, further comprising:
   dividing, by the one or more processors, the arranged task into smaller data batches; and
   scheduling, by the one or more processors, the smaller data batches to be completed at an available data center with the lowest computing cost.

5. A method in accordance with claim 1, wherein the step of determining lowest cost computing task schedule from available data centers further comprises:
   identifying, by the one or more processors, a renewable energy forecast; an ambient temperature forecast; a cooling forecast; a utility cost; a cost of charging batteries, and a cost of discharging batteries for the energy profiles of the available data centers;
   determining, by the one or more processors, the energy profiles; and
   identifying, by the one or more processors, available data center with the lowest computing cost schedule based on the energy profiles.

6. A method in accordance with claim 1, further comprising:
   determining, by the one or more processors, a cost of data transfer between a first data center and a second data center;
   identifying, by the one or more processors, the lower computing cost of the second data center; and
   transferring, by the one or more processors, a task to be performed by computing resources within the second datacenter.

7. A non-transitory computer program product for scheduling cost efficient data center load distribution, the non-transitory computer program product comprising:
   one or more computer readable storage media and program instructions stored on the one or more computer readable storage media, the program instructions comprising:
   program instructions to receive, by one or more processors, a task to be performed by computing resources within a datacenter;
   program instructions to identify, by one or more processors, all available data centers to perform the task;
   program instructions to determine, by one or more processors, a lowest computing cost task schedule for each available data center, wherein the lowest computing cost task schedule comprises:
      program instructions to calculate a marginal cost associated with each available datacenter, the marginal cost representing an estimate of future energy cost with respect to a computational load (L) and time (t),
      program instructions to generate, for each available data center, a response surface plot of the calculated marginal cost as a function of time (t) and the computational load (L) per unit of time,
      program instructions to find a projected area on the t-L plane in each of the response surface plots, and
      program instructions to optimize the projected area such that a volume underneath each of the response surface plots corresponds to a smallest volume, wherein the smallest volume is associated with the lowest computing task schedule; and
   program instructions to schedule, by one or more processors, the task to be performed at the available data center with the lowest computing cost task schedule.

8. A non-transitory computer program product in accordance with claim 7, wherein receiving a task further comprises:
   program instructions to determine a number of operations to be performed; and
   in response to determining a number of operation to be performed; program instructions to identify any deadlines for those operations.

9. A non-transitory computer program product in accordance with claim 8, wherein:
   program instructions to determine a number of operations to be performed comprises arranging the task based on identified deadlines; and size of calculation for each task.

10. A non-transitory computer program in accordance with claim 9, further comprising:

program instructions to divide the arranged task into smaller data batches; and program instructions to schedule the smaller data batches to be completed at an available data center with the lowest computing cost.

11. A non-transitory computer program product in accordance with claim 7, wherein determining lowest cost computing task schedule from available data centers further comprises:

program instructions to identify, by one or more processors, the renewable energy forecast, the ambient temperature forecast, the cooling forecast, the utility cost, and the cost of charging batteries, the cost of discharging batteries for the energy profiles of the available data centers;

program instructions to determine, by one or more processors, the energy profiles; and program instructions to identify, by one or more processors, the available data center with the lowest computing cost schedule based on the energy profiles.

12. A non-transitory computer program product in accordance with claim 7, further comprising:

program instructions to determine, by one or more processors, cost of data transfer between the first data center and the second data center;

program instructions to identify, by one or more processors, the lower computing cost of the second data center; and program instructions to transfer, by one or more processors, the task to be performed by computing resources within the second datacenter.

13. A computer system for scheduling cost efficient data center load distribution, the computer system comprising:

one or more computer processors;

one or more computer readable storage media;

program instructions stored on the computer readable storage media for execution by at least one of the one or more processors, the program instructions comprising:

program instructions to receive, by one or more processors, a task to be performed by computing resources within a datacenter;

program instructions to identify, by one or more processors, all available data centers to perform the task;

program instructions to determine, by one or more processors, a lowest computing cost task schedule for each available data center, wherein the lowest computing cost task schedule comprises:

program instructions to calculate a marginal cost associated with each available datacenter, the marginal cost representing an estimate of future energy cost with respect to a computational load (L) and time (t), program instructions to generate, for each available data center, a response surface plot of the calculated marginal cost as a function of time (t) and the computational load (L) per unit of time, program instructions to find a projected area on the t-L plane in each of the response surface plots, and program instructions to optimize the projected area such that a volume underneath each of the response surface plots corresponds to a smallest volume, wherein the smallest volume is associated with the lowest computing task schedule; and program instructions to schedule, by one or more processors, the task to be performed at the available data center with the lowest computing cost task schedule.

14. A computer system in accordance with claim 13, wherein receiving the task further comprises:

program instructions to determine a number of the operations to be performed; and in response to determining the number of operation to be performed; program instructions to identify any deadlines for those operations.

15. A computer system in accordance with claim 14, wherein:

program instructions to determine a number of operations to be performed comprises arranging the task based on the identified deadlines; and size of calculation for each task.

16. A computer system in accordance with claim 15, further comprising:

program instructions to divide the arranged task into smaller data batches; and program instructions to schedule the smaller data batches to be completed at an available data center with the lowest computing cost.

17. A computer system in accordance with claim 13, wherein determining the lowest cost computing task schedule from available data centers further comprises:

program instructions to identify, by one or more processors, the renewable energy forecast; the ambient temperature forecast; the cooling forecast; the utility cost; and the cost of charging batteries; the cost of discharging batteries for the energy profiles of the available data centers;

program instructions to determine, by one or more processors, the energy profiles; and program instructions to identify, by one or more processors, the available data center with the lowest computing cost schedule based on the energy profiles.

18. A computer system in accordance with claim 13, further comprising:

program instructions to determine, by one or more processors, the cost of data transfer between the first data center and the second data center;

program instructions to identify, by one or more processors, the lower computing cost of the second data center; and program instructions to transfer, by one or more processors, the task to be performed by computing resources within the second datacenter.

19. A method in accordance with claim 1, wherein the projected area on the t-L plane comprises a number of operations in the task and a deadline corresponding to each operation.

20. A method in accordance with claim 1, further comprising:

designating, by the one or more processors, the projected area as utilized such that no other task is scheduled for the projected area.

* * * * *